United States Patent [19]

Miller

[11] Patent Number: 5,237,617
[45] Date of Patent: Aug. 17, 1993

[54] SOUND EFFECTS GENERATING SYSTEM FOR AUTOMOBILES

[76] Inventor: Walter Miller, 6851 Roswell Rd., Apartment I-18, Atlanta, Ga. 30328

[21] Appl. No.: 779,405

[22] Filed: Oct. 17, 1991

[51] Int. Cl.$^5$ .............................................. H03G 3/00
[52] U.S. Cl. ...................................................... 381/61
[58] Field of Search .................... 446/409; 381/86, 71, 381/61

[56] References Cited

U.S. PATENT DOCUMENTS

| | | | |
|---|---|---|---|
| 4,077,138 | 3/1978 | Foerst | 358/104 |
| 4,506,380 | 3/1985 | Matsui | 381/86 |
| 4,946,416 | 8/1990 | Stern et al. | 446/409 |
| 5,097,923 | 3/1992 | Ziegler et al. | 381/71 |
| 5,111,507 | 5/1992 | Nakaji | 381/71 |

FOREIGN PATENT DOCUMENTS 3420463 12/1985 Fed. Rep. of Germany .

Primary Examiner—Forester W. Isen
Attorney, Agent, or Firm—Hopkins & Thomas

[57] ABSTRACT

A signal synthesizer system includes signal generating detectors for detecting the operating conditions of an engine and applying the signals to at least one analyzer circuit. At least one signal synthesizer combines the output of the analyzer with a control signal from a circuit programmed to generate signals indicative of a particular type of engine operating under the detected conditions. The output of the synthesizer is converted to analog signals and applied to a signal transducer to produce an audible auto output.

11 Claims, 1 Drawing Sheet

SOUND EFFECTS GENERATING SYSTEM FOR AUTOMOBILES

BACKGROUND OF THE INVENTION

This invention relates to sound effect generation, and, more particularly, to a sound effects generator for producing simulated automobile engine sounds.

Sound effects are often used in a variety of applications to simulate sounds or noises which typify the general or particular environment in which they are used. Thus, such generators find utility in various types of games, such as television games involving, for example, simulated motor racing or airplane flight or in the production of musical sounds, such as is shown and described in U.S. Pat. No. 4,783,812 of Kaneoka. Another frequently occurring use for a sound effect generator is in the production of realistic sounds for flight simulators which are used in pilot training, where it has been found that the addition of sound to the other sensory stimuli greatly enhances the realism of simulated flight. In U.S. Pat. No. 4,933,980 of Thompson there is shown such a sound effects generator in which simulated aircraft engine and simulated cockpit sounds are merged to produce a realistic ambience for the operator of the trainer, thereby providing, as closely as possible, realistic operating conditions.

Numerous arrangements exist in the prior art for altering already existing audio signals to produce a variety of sound effects. In U.S. Pat. No. 4,388,490 of Spector, there is shown an apparatus utilizing one or more signal processing modules, insertable in the apparatus, for achieving the desired sound effects. Other examples of altering audio signals to achieve desired effects are shown in U.S. Pat. Nos. 3,800,088 of Bode, 4,535,474 of Borish, et al. and 4,700,390 of Machida. The Borish et al. patent utilizes circuitry for selectively collecting, attenuating, and combining portions of signals stored in a memory to produce an audio signal with a fullness of sound referred to as ambience.

In a majority of the prior art systems, the sound effects are generated in response to various types of electronic control circuits, or, in the case of musical sounds, in response, for example, to the input of musical notes or tones to the generator. In the area of, for example, aircraft engine sounds, the sound effects are in response to electronic signals or triggering devices from within the system, and not from any signal input from an outside source or sources. Thus, it does not appear that there is any arrangement in the prior art for utilizing a signal input from an operating engine, for example, and altering and enhancing it to produce an engine sound that is characteristic of any of a variety of engine types, such as a V-8, in-line 8, V-12, or the like, or characteristic of a particular car, such as a Mercedes-Benz W-125 Grand Prix racer, or a Ferrari Testarossa. Such a system would furnish amusement to a vehicle operator, and, in certain instances, have the ancillary function of detecting engine problems.

In all of the foregoing prior art arrangements, the apparatus and associated circuitry, as well as the necessary signal processing to achieve the desired result, are extremely complex and, as is usually the case with electronic circuitry of complex design, costly. With the present state of the art of microchip capability, a system utilizing interchangeable microchips and a processing unit would greatly decrease the complexity and cost of the apparatus while achieving the desired sound effects.

SUMMARY OF THE INVENTION

The present invention is an apparatus for the enhancement of engine and exhaust sounds and for simulating the sounds of different types of engines, for use in an operating vehicle, having an analog signal output to the loud speakers of the vehicle, or to self-contained auxiliary speakers.

The apparatus of the invention comprises in a first illustrative embodiment thereof, an engine signal analyzer, to which is applied one or more signal inputs from the operating vehicle engine. Thus, the analyzer receives detected electrical signals from sensors placed in or on, for example, the tachometer or distributor indicative of engine RPM, from a detector indicating throttle position, from the coil, from the gear box and from the engine crankcase and manifolds. The analyzer interprets inputs from the sensors and generates controlling signals for a synthesis subsystem. An example of such interpretation is the conversion of a series of ignition coil pulses into a voltage level or digital value representing engine RPM. Another example is the amplification and digitization of vacuum sensor signals. Because this analysis is dependent on the design of the engine, there must be some method for adjusting or programming the analysis subsystem to take into account such factors as the number of cylinders, maximum RPM, maximum intake vacuum, etc. of the vehicle in which the devices is installed. The analyzer chip can consist of either analog or, preferably, digital electronic devices, or some hybrid of the two. It is similar in function and design to the engine analysis section of an electronic fuel injection controller. A digital engine analysis subsystem, for example, can comprise a preprogrammed microcontroller such as an MC68HC11 microchip and a set of active analog filters. In either case, actual engine parameters can be set by movable switches or jumper wires and simple potentiometer adjustments at the time of installation. If the engine is under load, such as when the vehicle is climbing a hill, the RPM may be less than an allowable maximum, but the throttle position may be at the maximum, and, in conjunction with the gear box, will indicate the load condition. Conversely, if the vehicle is going down hill, the RPM may rise while the throttle position and the gear box detectors produce signals indicating a reduced load. The analyzer utilizes all of the inputs to produce an output of one or more pulse trains indicative of such operating conditions.

The digital output signal of the first analyzer is applied to a digital synthesizer which likewise has applied thereto a control signal from a personality module which has been programmed to produce the engine sounds of, for example, a Bugatti. The synthesizer produces a digital signal output representing the engine and exhaust sounds of a Bugatti under the various operating conditions as determined by the first and second analyzers. The digital signal outputs of the synthesizer are applied to digital-to-analog converters to produce audio signal outputs which are, in turn, applied to audio amplifiers whose output, in turn, are applied to loudspeakers. For realism, the engine audio signal may be applied to the front speakers of the vehicle sound system and the exhaust audio signal may be applied to the rear speakers of the vehicle.

DETAILED DESCRIPTION

Figure 3:
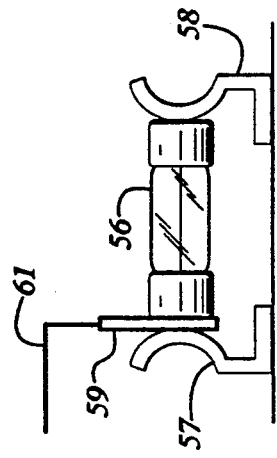
FIG. 3 is a view of one possible arrangement for obtaining power for the circuit of FIG. 1.
Figure 1:
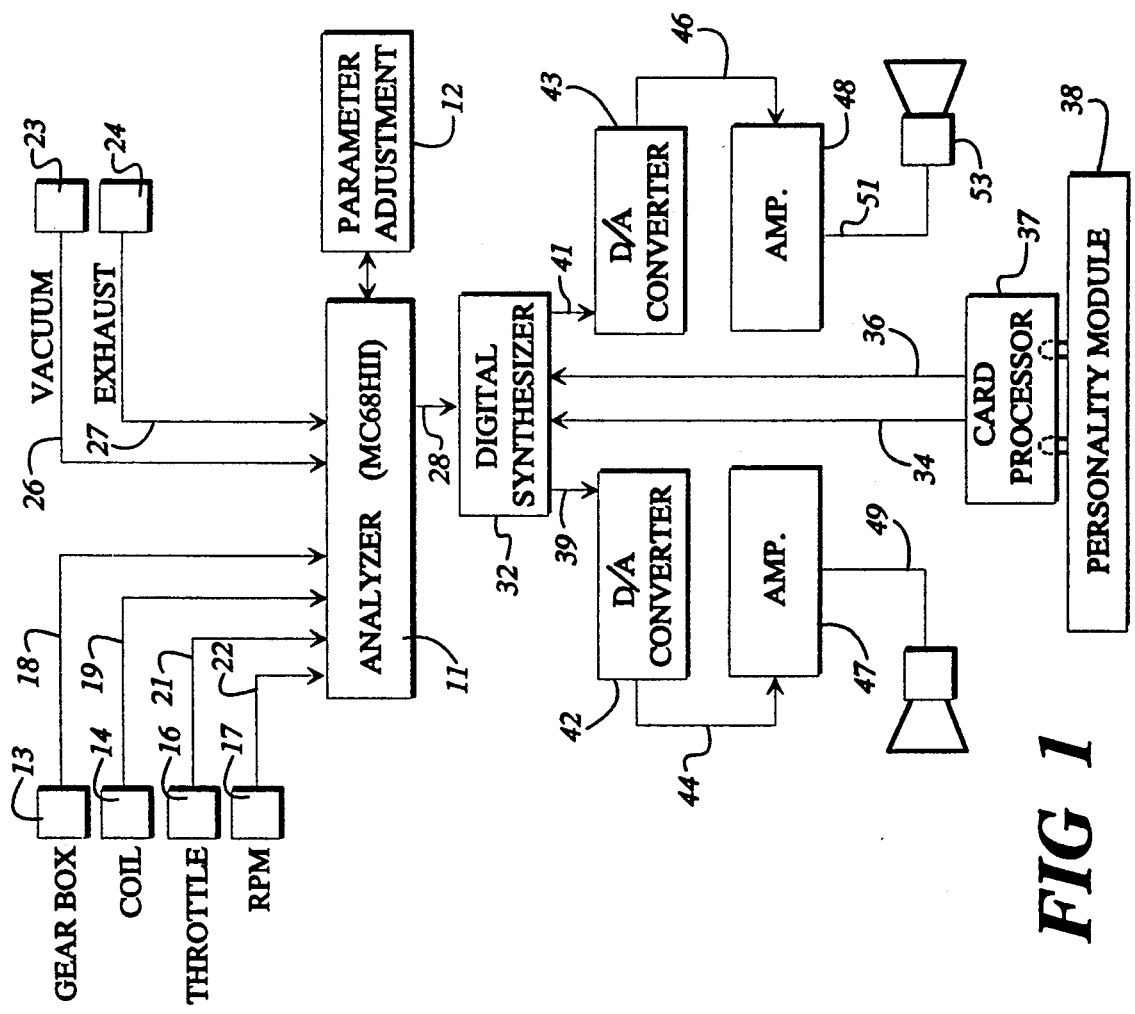
FIG. 1 is a block diagram of the components and circuit of the present invention.

In FIG. 1 there is shown a basic block diagram of the present invention which comprises an analyzer which has applied thereto, as shown in FIG. 1, a plurality of electrical inputs from detectors 13, 14, 16, and 17, through leads 18, 19, 21, and 22 respectively and from detectors 23 and 24 through leads 26 and 27 respectively. As shown, detector 13 is connected to the gear box of the vehicle in which the device is to be used for measuring the revolutions of the drive gears of the engine transmission, detector 14 is connected to the coil circuit of the vehicle for measuring the pulses thereof, detector 16 is connected to the throttle linkage to measure throttle position, and detector 17 is connected to the tachometer or tachometer cable of the vehicle. Each of the detectors is designed to produce an electrical output signal which is indicative of the instantaneous operating state of the vehicle component to which it is connected. The detectors 13, 14, 16, and 17 receive power from the vehicle electrical system, the electrical power being obtained from a connection such as is shown in FIG. 3, which will be discussed more fully hereinafter. The particular detectors themselves are of types well known in the art and generally commercially available.

In addition analyzer 11 has signal inputs thereto from detectors 23 and 24 through leads 26 and 27 respectively. Detector 23 is connected to a vacuum line of the vehicle engine, while detector 24 is connected to the exhaust system unless it is properly shielded against heat. Inasmuch as the entire exhaust system, from exhaust manifold to tail pipe, becomes extremely hot during operation of the engine, it might not be feasible to connect a detector directly to the exhaust system unless it is shielded against heat. In such a case, detector 24 could be, in effect, an audio detector positioned adjacent the tail pipe outlet, which converts the detected audio signal into an electrical signal indicative of the exhaust noise. Detector 23 may be inserted in a vacuum line in the engine, such as the vacuum line connected to the distributor, and reacts to the vacuum pulsations to produce an electrical signal. These pulsations are substantially the same as the pulsations in the exhaust system, hence the output of detector 23 can be used alone, without the output of detector 24, and supply analyzer 11 with an exhaust signal.

Analyzer 11 receives the several signal inputs and combines them and analyzes them to produce a digital signal output indicative of the engine operating conditions. It is desirable, for best operation, that analyzer 11 be adjusted to take into account the number of cylinders, maximum engine RPM, maximum intake vacuum, and the like. A parameter adjusting module 12 containing movable jumper wires and potentimeters is connected to analyzer 11 for this purpose. Thus, for a given gear ratio, if the vehicle is climbing a hill and the engine is laboring, the RPM of the engine may drop, but the throttle position may be at its maximum. On the other hand, if the vehicle is going down hill, the throttle may be at its minimum position while the RPM rise. Analyzer 11, which may comprise a commercially available programmed microchip, such as an MC68HC11, determines, on the basis of the several inputs, just what engine condition exists and generates a digital output signal on lead 28 representative of the overall engine operating condition.

The output of analyzer 11 is applied over lead 28 to a digital synthesizer 32. Synthesizer 32 may have several different channels in a single programmed microchip, or two separate synthesizers can also be used. Also applied to synthesizer 32 over lead 34 are signal outputs from a microchip card processor 37 which has means, such as a slot receptacle, for receiving a programmed microchip card which serves as a personality module 38. Card or microchip 38, which represents any one of a number of interchangeable cards, may be programmed to supply synthesizer 32 with signals which, when combined with the signals from analyzer 11 produce digital output signals which, when converted to analog signals, emulate the sounds of the engine and exhaust of, for example, a Ferrari Testarossa. Any number of cards may be created to give simulations of a Mercedes W-125, a Bugatti, an Offenhauser-engined Indianapolis racer, and many others.

It is this personality module which determines the type of engine to be emulated. To the casual listener, engine noise may seem to increase in pitch with RPM, but this is only half of what is happening. Combustion and exhaust noises are caused by the resonances in the cylinders and exhaust manifolds which are different for different engines. Other noises are based on the resonances of metal parts in the crankcase and valve train. Much like the ringing of a bell, these resonances do not change with engine speed. Only the rate and manner in which they are repeated vary. The engine resonances are a type of filter,and the input to this filter is a function of engine RPM. The synthesis subsystem consists of sets of digital or analog synthesizers, with each set emulating a particular aspect of the desired engine sound. For example, one set of synthesizers may produce the combustion and exhaust noises of the cylinders, while another generates gear noises. In a digital synthesis subsystem, all of these tasks may be performed in software by a single device, such as a single-chip digital signal processor (DSP). The personality module contains the operating parameters of the individual synthesizers. For example, in the analog case, the personality module might contain passive elements such as resistors and capacitors that are switched directly into the synthesizer circuits and patch lines to control the internal routing of synthesizer signals and may include an analog memory device containing engine sounds. In the digital case, this module might be a ROM containing wave tables and the coefficients of digital filters, or may, for example, be a memory device containing pre-recorded engine sounds.

Synthesizer 32 produces digital output signals on leads 39 and 41, respectively, which are applied as inputs to digital-to-analog converters 42 and 43 respectively. The analog outputs of converters 42 and 43 are applied, over leads 44 and 46 to amplifiers 47 and 48, respectively, where they are amplified and applied over leads 49 and 51 to loudspeakers 52 and 53, respectively. Amplifiers 47 and 48 are supplied with volume controls, not shown, and speakers 52 and 53 with a variable balance network, also not shown. Preferably, speaker 52 is the front speaker or speakers in an automobile stereo system, and speaker 53 is the rear speaker or speakers, thereby placing the engine noises in the front and the exhaust noises in the rear.

Because of the advanced state of miniaturization and capacity and programmed capability of microchips existing today, the entire arrangement depicted in FIG. 1, excluding the detectors and associated leads, might readily be housed in a small box no larger than a dash mounted radar detector. If desired, separate loudspeakers could be mounted in the box also.

Figure 2:
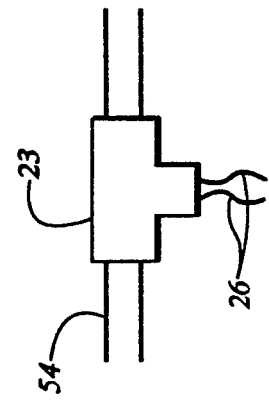
FIG. 2 is a view of a vacuum line detector arrangement for use in the circuit of FIG. 1.

In FIG. 2 there is shown, for purposes of illustration, the mounting of a vacuum line detector 23. The vacuum line 54, such as that connected to the distributor, may be cut and T-shaped detector 23 placed between the severed ends, as shown. Detector 23 is so constructed that, with this mounting, it does not block line 54 in any way, yet is in a position to generate signals indicative of the vacuum pulsations.

In FIG. 3 there is shown a simple attachment for obtaining power from the vehicle's power supply. A standard fuse 56, mounted between clips 57 and 58 in the fuse box, not shown, has inserted between one end of the fuse and the corresponding clip 57, a contact member 59 connected at one end of a lead 61. Contact 59 is shown as a simple flat plate, however, it may take the form of a clamp or other shape suitable for tapping into a hot lead of the vehicle. Lead 61, in turn, goes to those elements of the system of FIG. 1 requiring electrical power for operation.

The invention, as thus far described, is capable of making a Volkswagen sound like a Ferrari to the amusement of the driver and passengers. The system as shown in FIG. 1 includes, however, an additional feature. Quite often an engine can begin to develop problems which are, ab initio, undetectable to the human ear. Inasmuch as the present system operates off of signals from the engine, any incipient malfunction, such as partially fouled plugs, for example, is embodied in the signal output of one or more of the detectors, and that signal is present in the final output of the loudspeakers. Thus, at least for some incipient malfunctions, early detection thereof is inherent in the operation of the present system. This permits such malfunctions or deviations from an optimum operating condition to be corrected much sooner than might otherwise be possible, benefitting both the vehicle itself and the environment due to the reduction of unburned hydrocarbon emissions.

The foregoing detailed description has been directed to a preferred embodiment of the invention. Numerous changes or variations may occur to workers in the art without departure from the spirit and scope of the invention.

I claim:

1. A signal synthesizer comprising two or more detector means for generating discrete signals indicative of the operating conditions of a plurality of engine components,
   a signal analyzer for receiving the discrete signals from said detector means and producing a composite digital output signal indicative of the overall operating conditions of the engine as indicated by the received discrete signals,
   programmable means for generating a control signal indicative of a particular type of engine,
   synthesizer means for receiving and combining the output signal from said signal analyzer and said control signal from said programmable means for producing a digital output signal characteristic of the particular type of engine in the detected and analyzed operating condition,
   means for converting the digital output signal of said synthesizer means to an analog signal, and
   means for receiving said analog signal and producing an audible audio output signal.

2. A signal synthesizer as claimed in claim 1 wherein said plurality of detecting means comprises at least one detector for indicating the exhaust conditions of the engine.

3. A signal synthesizer as claimed in claim 1 wherein one of said detecting means comprises means for measuring the throttle position of the engine and generating a signal indicative thereof.

4. A signal synthesizer as claimed in claim 1 wherein one of said detector means comprises means for measuring the RPM of the engine and generating a signal indicative thereof.

5. A signal detector means as claimed in claim 1 wherein one of said detector means comprises means for measuring the revolutions of the drive gears of the engine transmission and generating a signal indicative thereof.

6. A signal synthesizer as claimed in claim 1 wherein one of said detector means comprises means for measuring the pulses of the coil of the engine and generating a signal indicative thereof.

7. A signal synthesizer as claimed in claim 3 wherein said one detector is incorporated into a vacuum line of the engine for measuring the pulses in said vacuum line and generating a signal indicative thereof.

8. A signal synthesizer system comprising first and second signal analyzer means,
   a plurality of means for applying a plurality of different input signals to said first and second analyzer means, said signals being indicative of a plurality of operating parameters of the engine indicating the operating conditions thereof,
   first and second synthesizer means for receiving digital signals from said first and second analyzer means respectively,
   programmed means for applying synthesized signals characteristic of a particular type of automobile engine to said first and second synthesizer means,
   said first and second synthesizer means being adapted to combine the signals from said first and second analyzer means and from said programmed means to produce digital output signals indicative of the said particular type of engine operating in accordance with the detected engine operating conditions,
   converter means for converting the digital output signals from said first and second synthesizer to analog signals, and
   transducer means for producing audio output signals from said analog signals.

9. A signal synthesizer system as claimed in claim 8 and further including means for controllably amplifying the analog output signals from said converter means.

10. A signal synthesizer system as claimed in claim 8 wherein said transducer means comprises a first loud speaker.

11. A signal synthesizer system as claimed in claim 10 and further including a second loudspeaker.

* * * * *